United States Patent [19]

Lester

[11] Patent Number: 4,915,125

[45] Date of Patent: Apr. 10, 1990

[54] VALVE STEM EXTENSION ASSEMBLY

[75] Inventor: Leo M. Lester, Medford, Mass.

[73] Assignee: Asahi/America, Inc., Medford, Mass.

[21] Appl. No.: 420,570

[22] Filed: Oct. 12, 1989

[51] Int. Cl.$^4$ .............................. F16L 5/00; F16L 3/08
[52] U.S. Cl. .................................... 137/368; 248/74.1
[58] Field of Search ............... 137/363, 364, 365, 366, 137/367, 368, 369, 370; 52/20; 248/74.1, 315; 251/293

[56] References Cited

U.S. PATENT DOCUMENTS

| 343,416 | 6/1886 | Smith et al. | 137/368 |
| 1,608,772 | 11/1926 | Cole | 137/365 |
| 2,193,758 | 3/1940 | Bentley | 248/74.1 |
| 2,511,209 | 6/1950 | Johnson | 137/365 |
| 4,717,099 | 1/1988 | Hubbard | 248/74.1 |

FOREIGN PATENT DOCUMENTS 15747 11/1906 Fed. Rep. of Germany ...... 137/368

*Primary Examiner*—A. Michael Chambers
*Attorney, Agent, or Firm*—Anthony J. Casella; Gerald E. Hespos

[57] ABSTRACT

A valve stem support assembly is provided to prevent excessive loads on valves caused by very long heavy valve stem extensions. The support assembly includes a support casing surrounding the valve stem extension. A support bracket is rigidly mounted to the casing and extends into proximity with the valve stem extension. A bushing is engaged by the bracket and substantially surrounds the valve stem extension. A support collar is rigidly mounted to the valve stem extension and is disposed in supporting relationship to the bushing and the bracket. The weight of the elongated valve stem extension is transmitted to the bracket through the collar and the bushing to avoid excessive loads on the valve.

20 Claims, 2 Drawing Sheets

VALVE STEM EXTENSION ASSEMBLY

BACKGROUND OF THE INVENTION

Lange volumes of biodegradable materials are accumulated in landfills and solid waste disposal sites throughout the world. Solid waste disposal sites near many urban regions literally have generated mountains at locations that once had been flat marshlands. While urban areas are choking with accumulated solid wastes, most countries are experiencing an energy shortfall. Thus, many countries, including the United States, generate more solid waste than the population can conveniently process, and simultaneously consume more energy than the country can produce.

In recent years many government agencies have attempted to capitalize on the known fact that the decaying biodegradable materials in solid waste disposal sites will generate methane gas that can be used as a fuel in power generators and in some vehicles. Thus, the objectionable landfills and solid waste disposal sites can be used positively to meet energy needs.

The methane gas generated in landfills and solid waste disposal sites can be accessed only by providing below grade pipe systems in the landfill for tapping and controlling the flow of methane gas. In some instances the pipe systems for tapping the methane gas can be installed at a below grade location in an established landfill or solid waste disposal site. More desirably, however, pipe systems will be laid prior to depositing the solid waste or fill. It has been found extremely desirable to employ thermoplastic pipes, valves and fittings in view of their superior resistance to moisture and the corrosive materials present in the landfills or solid waste disposal sites.

The piping systems required to tap the methane gas in a landfill or solid waste disposal site will often be disposed 10-50 feet below grade. Even though the valves incorporated into such a system may be electrically operated, it will be necessary for the valve stems to be accessible from an at grade location. Thus, the valves incorporated into such systems may have extended valve stems of 10-50 feet in length. Furthermore, the length of a valve stem may require periodic extensions as the landfill is accumulating. For example, a valve stem may initially be approximately ten feet long, but may ultimately reach a length of forty or fifty feet.

The valve stem is connected to a valve member movably disposed within a valve housing to alternately open or block a flow passage in the valve. The valves used in this environment may be ball valves, gate valves, butterfly valves, or diaphragm valves. The valving member is subjected to considerable pressure by the gas or fluid flowing through the system. As a result, it is necessary for a valve stem to be very strong to transmit the necessary torque to the valve member. This necessarily requires the valve stem to be of considerable weight. As the length of the valve stem is extended to 10-50 feet for use in the above described landfills and solid waste disposal sites, the weight of the valve stem becomes very significant and can affect the operation of the valve. In particular, the weight of a long valve stem creates loads that can break or deform portions of a valve or can significantly impede efficient operation of the valve.

In view of the above, it is an object of the subject invention to provide an efficient valve system for use in landfills and solid waste disposal sites.

It is another object of the subject invention to provide a valve having an elongated valve stem extension operatively connected to the valve.

An additional object of the subject invention is to provide a support system for supporting an elongated heavy valve stem.

Yet another object of the subject invention is to provide a valve stem assembly that ensures efficient operation of a valve despite the use of a long heavy valve stem.

SUMMARY OF THE INVENTION

The subject invention is directed to a support assembly that includes or is used with a valve. In particular, the support assembly of the subject invention enables the use of a long heavy valve stem extensions without affecting the operation of the valve that is structurally and operatively connected thereto. The support assembly, the valve stem extension and valve of the subject invention are well suited for pipe systems used to tap methane gas from below grade locations in a landfill or a solid waste disposal site. The assembly is particularly well suited for use with thermoplastic pipe and thermoplastic valve systems.

The support assembly of the subject invention includes or is used with an elongated valve stem extension which may be stainless steel. One end of the valve stem extension may be connectable to the original valve stem, which in turn connects to a valving member movably disposed within a valve housing. The opposed end of the valve stem extension may be connected to an appropriate actuation means such as a handle or electromechanical motorized control for enabling appropriate rotational movement of the valve stem extension and corresponding actuation of the valving member connected thereto.

The assembly of the subject invention further comprises at least one support means mountable to the valve stem extension at at least one location therealong for supporting the valve stem extension relative to the valve. The support means may comprise one or more collars securely connectable to the valve stem extension for rotation therewith. The collar or other such support means preferably defines a larger cross-sectional dimension than the valve stem extension, and preferably is securely, but adjustably, mounted to the valve stem extension. For example, a generally annular collar may be slidably disposed on the valve stem, but may further include an aperture extending therethrough for receiving an attachment means that enables the collar to be fixed at a selected longitudinal location along the valve stem extension. The aperture through the collar may be threaded and a bolt means, such as a set screw, may be threadedly engaged therewith for securely engaging the collar to the valve stem. The bolt means extending through the collar may be receivable in a transverse aperture in the valve stem. Alternatively, an unthreaded pin may extend through an aperture in the collar and may be receivable in a corresponding aperture in the valve stem extension. With either of these embodiments, the collar is longitudinally fixed relative to the valve stem extension and is rotatable therewith. As noted above, a plurality of such collars may be mounted to the valve stem extension at selected locations therealong. In certain embodiments, the collars may be integral with the valve stem or integral with one of several sections of a valve stem extension assembly that are joined in end-to-end relationship.

The assembly of the subject invention may further comprise at least one support bracket in supporting engagement with one of said collars. The support bracket may include a sleeve in proximity to the valve stem extension. The sleeve may be cylindrical and may be dimensioned and disposed to supportingly engage the collar or other such support means mounted to the valve stem extension. The support bracket may further include means for mounting to an external support. The external support may be rigidly incorporated into the landfill, solid waste or other such medium through which the valve stem extension passes. In particular, the system may further include a casing generally surrounding and in spaced relationship to the valve stem extension for preventing direct contact between the valve stem extension and the landfill or solid waste. The casing may be defined by precast or cast in place concrete which effectively defines a channel, with the valve stem extension passing centrally therethrough. The support bracket is securely connected to the casing and/or may be molded therein such as by pouring concrete around the end of the support bracket remote from the valve stem extension.

The assembly of the subject invention may further include at least one bushing disposed between the support bracket and both the collar and the valve stem extension. The bushing preferably is formed from a material having desirable friction and load bearing characteristics to enable proper support for the collar and valve stem extension relative to the support bracket and to permit relatively easy rotation of the valve stem extension and collar relative to the bracket. A preferred bushing may be formed from a PTF material, such as TEFLON®. The bushing may comprise a generally cylindrical portion disposed intermediate the valve stem extension and the sleeve of the support bracket. The bushing may further include a flange extending outwardly from one end and in supporting and sliding relationship between the collar and the bracket. Thus, the collar will be supported on the axial end of the bushing having the flange and will be rotatably slidably engaged therewith to permit rotation of the valve stem extension. The bushing may be formed from at least two longitudinally extending portions to facilitate assembly of the bushing around a previously positioned valve stem extension and relative to the bracket.

The system of the subject invention may further be considered to comprise at least one of the valves to which the above described valve stem extension is connected, and preferably a butterfly valve or a ball valve. The preferred valves are formed from a thermoplastic material. Each valve may be provided with one of the above described valve stem extension and support assemblies, with each assembly comprising at least one collar and an equal number of support brackets and bushings.

DETAILED DESCRIPTION OF THE PREFERRED EMBODIMENT

Figure 1:
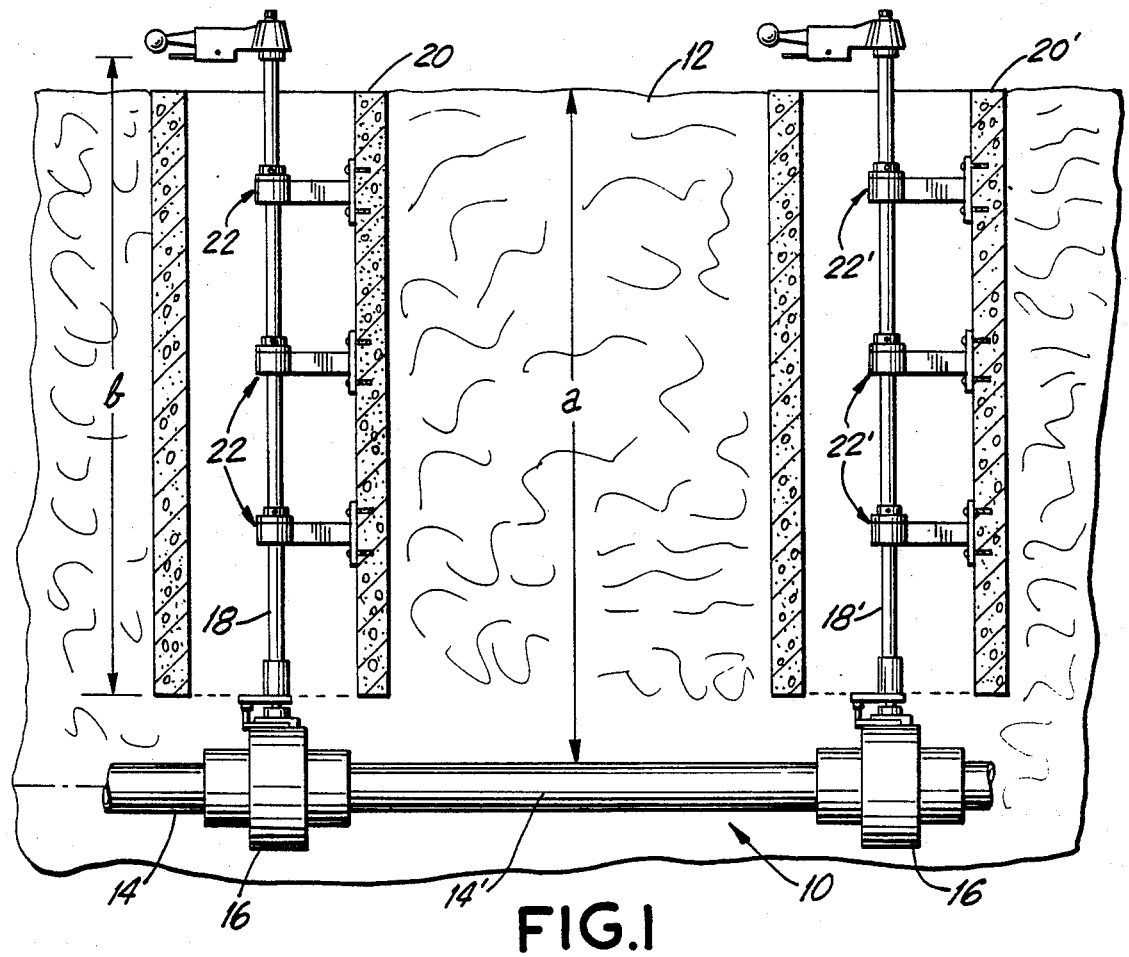
FIG. 1 is a cross-sectional view of a pipe system incorporating a plurality of the valve stem assemblies of the subject invention.

A pipe system in accordance with the subject invention is identified generally by the numeral 10 in FIG. 1. The pipe system 10 is buried in a solid waste disposal site 12 which comprises biodegradable material, such as household trash, which may be interspersed with layers of fill dirt. The pipe system 10 includes a plurality of lengths of pipe 14, 14' which preferably are formed from a thermoplastic material. The pipe system 10 further includes a plurality of valves 16, 16' which are connected to the pipes 14, 14'. The valves 16, 16' also preferably are formed from a thermoplastic material. It will be understood that the system shown in FIG. is largely schematic and that the dimensions and configurations of the pipes 14, 14', valves 16, 16' and the landfill 12 are subject to considerable variation.

Each valve 16, 16' includes a valving member (not shown) disposed therein which is operative to selectively open or close the valve 16, 16'. In this context, an open valve 16 is operative to permit a flow of liquid or gas between the pipe 14 and the pipe 14'. A closed valve 16 is operative to prevent such flow. The operation of the valve member within the valve 16, 16' is controlled by valve stem extensions 18, 18' which are extensions of valve stems extending from the valves 16, 16'. In most pipe systems, the valve stem is relatively short. However, as noted above, in pipe systems intended to tap methane gas generated during the decay of biodegradable material in a landfill, the pipes 14, 14' will be disposed at a depth "a" within the landfill 12 which may be 10–50 feet below grade level. In these situations, the valve stem extensions 18, 18' must be of sufficient length to extend from the valve 16, 16' to an above grade location. Thus, each valve stem extension 18, 18' may define a length "b" which approximates the depth "a" of the pipe 14, 14'. These very long valve stem extensions 18, 18' will be of considerable weight, and thus will generate loads on the associated valve 16, 16' in proportion to their weight and length. These significant loads exerted by the weight of the long valve stem extensions 18, 18' on the valves 16, 16' can affect the operation of the valve 16, 16' by deforming or buckling the valve stem extensions 18, 18', by deforming the valving member (not shown) or by deforming or breaking of portions of the housing of the valve 16, 16'.

These potential problems are avoided by the pipe system 10 of the subject invention. In particular, the pipe system 10 includes support casings 20, 20' which substantially surround the respective valve stem extensions 18, 18' and which are structurally and immovably supported within the landfill 12. The casings 20, 20' depicted in FIG. 1 and shown and described further below may be precast or cast in place concrete around which the landfill 12 is disposed. However, other casings may be employed, such as casings formed from a corrugated metal conduit. As shown in FIG. 1, the pipe system 10 further includes a plurality of valve stem support assemblies which are identified generally by the numerals 22, 22' and which extend between the casing 20, 20' and the respective valve stem 18, 18'.

Figure 2:
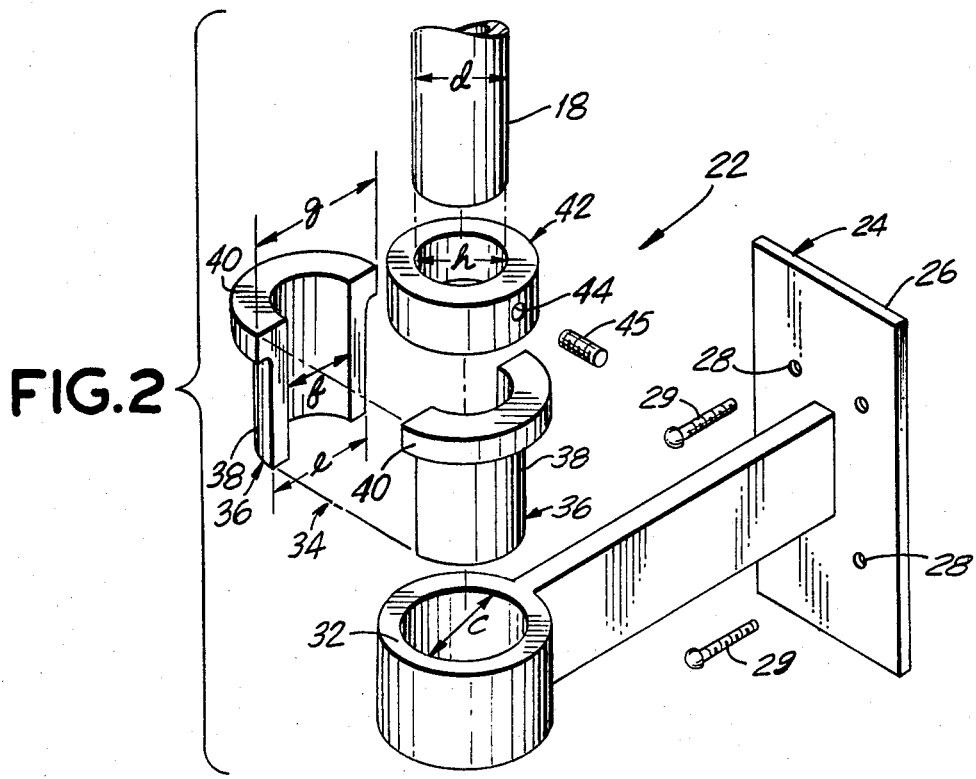
FIG. 2 is an exploded perspective view of the valve stem assembly of the subject invention.

The valve stem support assembly 22 is illustrated in greater detail in FIG. 2. In particular, the valve stem support assembly includes a bracket 24 having a generally planar support plate 26 with a plurality of mounting apertures 28 extending therethrough. The mounting apertures 28 are dimensioned to receive bolts 29 which enable the support plate 26 of the bracket 24 to be securely affixed to the casing 20 as illustrated in FIGS. 1, 13 and 14. The bracket 24 shown in FIG. 2 further includes a support arm 30 extending rigidly from the support plate 26. The support arm 30 may be integrally formed with the support plate 26 or may be separately but rigidly affixed thereto by welding or the like. A generally cylindrical support sleeve 32 is rigidly disposed at the end of the support arm 30 remote from the support plate 26. The support sleeve 32 defines an internal diameter "c" which significantly exceeds the diameter "d" of the valve stem 18 as shown in FIG. 2.

The valve stem support assembly 22 further comprises a generally cylindrical bushing 34. The bushing 34 is formed from opposed longitudinal halves 36 which are substantially identical to one another and which can be placed in opposed relationship to define the cylindrical bushing 34. The provision of longitudinally extending bushing halves 36 facilitates the assembly of the bushing 34 onto the valve stem extension 18 as explained further herein. Each longitudinal half 36 of the bushing 34 is defined by a generally semicylindrical portion 38 and an enlarged outwardly extending flange 40 at one longitudinal end. The semicylindrical portions 38 define an external diameter "e" approximately equal to or slightly less than the internal diameter "c" of the support sleeve 32 on the support bracket 24 described above. As a result, the semicylindrical portions 38 of the bushing 34 can be slidably inserted within the support sleeve 32. The semicylindrical portions 38 of each longitudinal half 36 of the support sleeve 34 further define an internal diameter "f" which is equal to or slightly greater than the diameter "d" of the valve stem extension 18. As a result, the valve stem 18 can be slidably and rotatably disposed within the assembled bushing 34.

The flange 40 at one longitudinal end of each half 36 of the bushing 34 defines a diameter "g" which substantially exceeds the internal diameter "c" of the support sleeve 32 on the support bracket 24. As a result, the flange 40 can be supported on the support sleeve 32 while the cylindrical portion 38 of each half 36 of the support sleeve 40 is disposed within the support sleeve 32. The flange 40 thus prevents longitudinal movement of the bushing 34 relative to the support sleeve 32 of the support bracket 24. The bushing 34 preferably is formed from a material able to withstand compressive forces and having desirable frictional characteristics relative to the valve stem extension 18. A preferred material for the bushing 34 is a PTF material such as TEFLON ®.

The valve stem support assembly 22 further comprises a generally cylindrical collar 42 having an internal diameter "h" which is equal to or slightly greater than the diameter "d" of the valve stem extension 18. The external diameter of the collar 42 is not critical but must exceed the internal diameter "f" of the bushing 36 and may be approximately equal to or slightly less than the external diameter "g" defined by the flange 40 on the bushing 34. Thus, as explained further below, the collar 42 can be slidably disposed over the valve stem extension 18 and can be disposed in supporting and sliding relationship to the flange 40 of the bushing 34. The collar 42 includes a threaded aperture 44 and a set screw 45 for securely mounting the collar 42 at a selected longitudinal position along the valve stem extension 18. However, other mounting means, such as unthreaded pins, may be employed.

Figure 3:
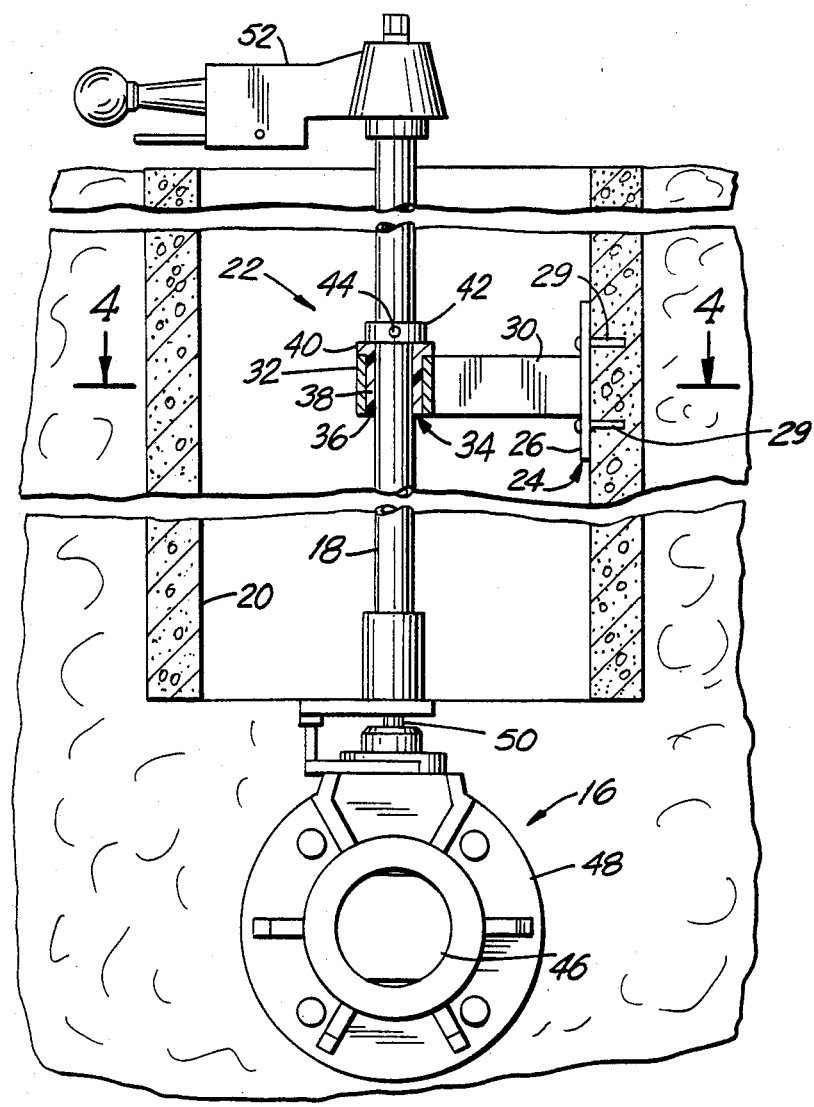
FIG. 3 is a cross-sectional view showing the valve stem assembly of the subject invention mounted to a valve.
Figure 4:
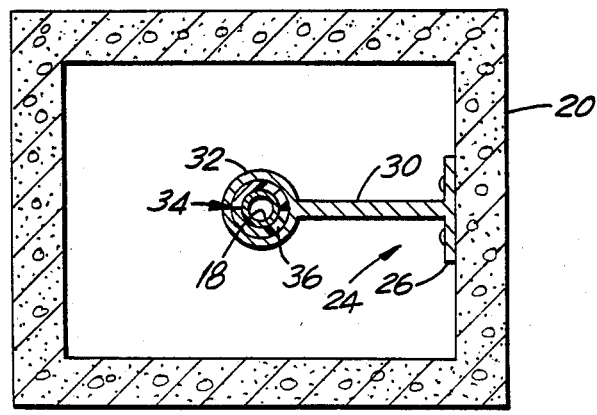
FIG. 4 is cross-sectional view taken along line 4—4 in FIG. 3.

The valve stem support assembly 22 is depicted in its assembled form in FIGS. 3 and 4. More particularly, the valve stem support assembly 22 is used in combination with a valve 16 and a rigid casing 20 as explained above. The valve 16 preferably is a butterfly valve or a ball valve having a valving member 46 rotatably disposed in a housing 48. The valving member 46 is rigidly connected to a valve stem 50 which rotatably extends through the housing 48. Thus, rotation of the valve stem 50 about its longitudinal axis causes a corresponding rotation of the valving member 46 to selectively open or close a fluid passage through the housing 48 of the valve 16. The valve stem 50 is securely connected to the valve stem extension 18. As explained above, the valve stem extension 18 may extend a length of between approximately ten feet and at least fifty feet from a below grade location to an above grade location in a landfill or solid waste disposal site. The valve stem extension 18 may be connected to an actuator 52 which is schematically illustrated in FIGS. 1 and 3 as being a handle. However, it is to be understood that other actuators, such as electrical or pneumatic actuators, may be employed. As noted above, the casing 20 substantially surrounds the valve stem extension 18 and is formed from a rigid material such as a cast in place concrete.

The support plate 26 of the support bracket 24 is securely mounted to the casing 20 by attachment bolts 29. The support arm 30 extends rigidly from the support plate 26 such that the support sleeve 32 is generally concentrically aligned with the valve stem 50. The valve stem extension 18 is then slidably disposed through the support sleeve 32 and is appropriately connected to the valve stem 50. During this installation, the valve stem extension 18 may be temporarily supported by fixturing means disposed at an above grade location. The opposed halves 36 of the bushing 34 are then assembled around the valve stem extension 18. In particular, the cylindrical portions 38 of each bushing half 36 are slidably disposed between the valve stem extension 18 and the support sleeve 32 such that the flange 40 is supported on one longitudinal end of the support sleeve 32. The collar 42 is then slidably advanced along the valve stem extension 18 into generally abutting relationship with the flange 40 of the bushing 34. The attachment means 45 is then appropriately advanced through the aperture 44 in the collar 42 to securely fix the collar 42 to the valve stem extension 18. As noted above, the bushing 34 has desirable frictional characteristics relative to both the valve stem extension 18, the collar 42 and the support sleeve 32. As a result, the valve stem extension 18 and the collar 42 are readily rotatable in sliding relationship with the bushing 34. Any temporarily positioned support fixtures at the above grade location can be removed after the collar 42 has been securely affixed to the valve stem extension 18 in supporting relationship with the bushing 34 and the support bracket 24. In this manner, the collar 42 cooperates with the bushing 34, the support bracket 24 and the casing 20 to support the long and heavy valve stem extension 18 and thereby avoiding excessive and potentially damaging loads on the valve stem 50, the valving member 46 and the valve housing 48.

In summary, a valve stem extension and support assembly is provided. The assembly comprises an elongated valve stem extension which may define a length of between ten and at least fifty feet. The substantial weight of the valve stem extension is supported to avoid excessive loads on the valve associated therewith. The support for the valve stem is provided by an assembly which includes a support casing rigidly and substantially immovably disposed around the valve stem extension. At least one support bracket extends rigidly from the casing. An end of the support bracket includes a sleeve which at least partly surrounds the valve stem extension. A bushing is disposed intermediate the valve stem extension and the sleeve. A collar is rigidly mounted to the valve stem extension and is in supporting relationship with the bushing. The weight of the valve stem extension thus is transmitted to the bushing and the support bracket through the collar. A plurality of such support assemblies may be provided along the length of the valve stem extension in accordance with the relative length and weight of the valve stem extension and load limits of the associated valve.

While the invention has been described with respect to certain preferred embodiments, it is apparent that various changes can be made without departing from the scope of the invention as defined by the appended claims. For example, support casings other than the illustrated concrete casing may be provided around the valve stem extension. The bushing may be of unitary construction rather than the longitudinal halves depicted above. It is further to be understood that the support assembly described herein may be used in environments other than the landfills and solid waste disposal sites for which it is primarily intended. Similarly, the valve stem extension may be unitary or of several longitudinal sections interconnected in end-to-end relationship. These and other variations will be apparent to a person having skill in this art after having read this disclosure.

I claim:

1. A valve stem support assembly for use with a valve, said assembly comprising:
   an elongated valve stem extension operatively connected to said valve;
   a rigid casing supported in spaced relationship to said valve stem extension;
   at least one support bracket rigidly connected to said casing and extending therefrom, said support bracket including an end disposed in proximity to said valve stem extension; and
   a collar disposed at a fixed longitudinal position on said valve stem extension and in proximity to the end of the support bracket, such that weight loads of said valve stem extension are at least partly transmitted to the support bracket through the collar for preventing excessive loads on the valve.

2. A valve stem support assembly as in claim 1 wherein said casing defines at least one wall extending generally parallel to the valve stem extension and in spaced relationship thereto.

3. A valve stem support assembly as in claim 2 wherein said casing substantially surrounds said valve stem extension.

4. A valve stem support assembly as in claim 3 wherein said casing is formed from concrete.

5. A valve stem support assembly as in claim 1 wherein the end of the support bracket comprises a support sleeve substantially surrounding the valve stem extension.

6. A valve stem support assembly as in claim 1 further comprising a bushing disposed intermediate the support bracket and the valve stem extension.

7. A valve stem support assembly as in claim 6 wherein said bushing includes a generally cylindrical portion surrounding the valve stem extension and a flange extending outwardly from the cylindrical portion of the bushing, said flange being disposed intermediate the support bracket and the collar on the valve stem extension.

8. A valve stem support assembly as in claim 6 wherein the bushing is defined by a plurality of longitudinally extending components selectively assemblable around the valve stem extension.

9. A valve stem assembly as in claim 8 wherein the bushing is defined by opposed substantially identical longitudinally extending halves.

10. A valve stem assembly as in claim 1 wherein the support bracket comprises a support plate securely mounted to the casing, a support arm rigidly extending from the support plate into proximity with the valve stem extension, said end of the support bracket defining a generally cylindrical sleeve rigidly connected to the support arm and surrounding at least a portion of the valve stem extension.

11. A valve stem support assembly as in claim 1 comprising a plurality of said support brackets and said collars, each of said support brackets being rigidly mounted to said casing at locations spaced along the valve stem extension.

12. A valve stem support assembly as in claim 1 wherein the valve stem extension defines a length of between approximately ten feet and fifty feet.

13. A valve stem support assembly as in claim 1 wherein the valve stem extension defines a plurality of valve stem extension sections connected in end-to-end relationship.

14. A pipe system for tapping methane gas from a solid waste disposal site, said system comprising an array of pipes disposed at a below grade location in said solid waste disposal site and at least one valve in communication with said pipes, said valve comprising a housing, a valving member movably mounted in the housing and a valve stem rigidly connected to the valving member and extending from the housing, a valve stem extension connected to the valve stem and extending substantially to an at grade location, a casing disposed substantially below grade in the solid waste disposal site and extending in substantially surrounding relationship to the valve stem extension from a below grade location in proximity to the valve to an at grade location, at least one support bracket rigidly mounted to the casing and extending into proximity with the valve stem extension, and a support collar longitudinally fixed to the valve stem extension and supported in sliding rotatable relationship to the bracket, whereby weight loads generated by the valve stem extension are transmitted from the collar through the support bracket to the casing thereby avoiding excessive loads on the valve.

15. A system as in claim 14 comprising a plurality of support brackets mounted to the casing at spaced apart locations along the valve stem extension, and a collar longitudinally fixed on the valve stem extension adjacent each said support bracket.

16. A system as in claim 14 further comprising a bushing disposed intermediate the support bracket and the valve stem extension.

17. A system as in claim 16 wherein the bushing includes a generally cylindrical portion surrounding the valve stem extension and an outwardly extending flange disposed intermediate the collar and the support bracket.

18. A system as in claim 16 wherein the bushing is formed from a PTF material.

19. A system as in claim 18 wherein the bushing is formed from opposed longitudinal halves.

20. A system as in claim 14 wherein the valve stem extension comprises a plurality of sections connected in end-to-end relationship.

* * * * *